United States Patent
Choi et al.

(10) Patent No.: US 6,842,203 B2
(45) Date of Patent: Jan. 11, 2005

(54) LIQUID CRYSTAL DISPLAY OF LINE-ON-GLASS TYPE

(75) Inventors: Seung Kyu Choi, Daegu (KR); Kwang Soon Park, Daegu (KR); Sang Moo Song, Daegu (KR); Choel Min Woo, Sangju-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/326,159

(22) Filed: Dec. 23, 2002

(65) Prior Publication Data

US 2003/0189679 A1 Oct. 9, 2003

(30) Foreign Application Priority Data

Apr. 8, 2002 (KR) .................. 10-2002-0018896

(51) Int. Cl.[7] .............................................. G02F 1/136
(52) U.S. Cl. ....................................................... 349/46
(58) Field of Search ............................................ 349/46

*Primary Examiner*—Tarifur R. Chowdhury
*Assistant Examiner*—Jeanne Andrea Di Grazio
(74) *Attorney, Agent, or Firm*—McKenna Long & Aldridge LLP

(57) ABSTRACT

A line-on-glass (LOG)-type liquid crystal display device includes a picture display area having liquid crystal cells arranged where gate lines and data lines cross each other, a storage capacitor provided at each of the liquid crystal cells to maintain a charged pixel voltage, and a dummy gate line. (LOG)-type signal lines are provided by a line-on-glass technique outside a picture display area and transmit driving signals required by gate driver integrated circuits to drive the gate lines. The dummy gate line has a smaller resistance value than others of the gate lines.

22 Claims, 3 Drawing Sheets

LIQUID CRYSTAL DISPLAY OF LINE-ON-GLASS TYPE

This application claims the benefit of Korean Patent Application No. 2002-18896, filed on Apr. 8, 2002, which is hereby incorporated by reference for all purposes as if fully set forth herein.

BACKGROUND OF THE INVENTION

1. Field of the Invention

The present invention relates to liquid crystal displays, and more particularly to line-on-glass (LOG) type liquid crystal displays that are capable of preventing deterioration in picture quality caused by a line resistance of LOG gate low voltage lines arranged on a liquid crystal display panel.

2. Description of the Related Art

Generally, liquid crystal displays (LCDs) use electric fields to control light transmittance characteristics of a layer of liquid crystal material. Accordingly, LCDs typically include a liquid crystal display panel having a plurality of liquid crystal cells arranged in a matrix pattern and a driver circuit for driving the plurality of liquid crystal cells to display a picture on the liquid crystal display panel.

The plurality of liquid crystal cells are arranged on the liquid crystal display panel at locations where gate lines cross data lines. Electric fields may be applied to the layer of liquid crystal material via pixel and common electrodes arranged on the liquid crystal display panel. Each pixel electrode is connected to a data line via source and drain electrodes of switching devices such as thin film transistors. Gate electrodes of each thin film transistor are connected to corresponding gate lines and allow pixel voltage signals to be selectively applied to corresponding pixel electrodes.

The driver circuit includes a gate driver for driving the gate lines, a data driver for driving the data lines, a timing controller for controlling the gate and data drivers, and a power supply for supplying driving voltages used in driving the LCD. The timing controller controls the gate and data drivers by controlling a driving timing of the gate and data drivers and by applying pixel data signals to the data driver. Driving voltages generated by the power supply include common (Vcom), gate high (Vgh), gate low (Vgl) voltages, etc. The gate driver sequentially applies scanning signals to the gate lines to sequentially drive the liquid crystal cells within the liquid crystal display panel one gate line at a time. The data driver applies data voltage signals to each of the data lines whenever a gate line is in receipt of a gate signal. Accordingly, LCDs control light transmittance characteristics of liquid crystal material using electric fields applied between pixel and common electrodes in accordance with pixel voltage signals specific to a liquid crystal cell.

Data and gate drivers are directly connected to the liquid crystal display panel and are provided as a plurality of integrated circuits (ICs). Each of the gate driver ICs and data driver ICs are mounted to the liquid crystal display panel using tape carrier package (TCP) or chip on glass (COG) techniques. Further TCP-type gate and data driver ICs are connected to the liquid crystal display panel via a tape automated bonding (TAB) technique.

TCP-type gate and data driver ICs, connected to the liquid crystal display panel by the TAB technique, receive control signals and direct current (DC) voltage signals transmitted over signal lines provided on a printed circuit board (PCB). For example, each of the data driver ICs are connected to each other in series via signal lines mounted on a data PCB, receive control signals from the timing controller, and receive pixel data signals and driving voltages from the power supply. Gate driver ICs are connected to each other in series, via signal lines mounted on a gate PCB, receive control signals from the timing controller, and receive driving voltages from the power supply.

COG-type gate and data driver ICs are connected to each other via signal lines formed using a line-on-glass (LOG) technique. Mounted on a lower glass substrate of the liquid crystal display panel, the signal lines formed using the LOG technique receive control signals from the timing controller and power supply and driving voltages from the power supply.

Even when the various driver ICs are connected to liquid crystal display panels via the TAB technique, the LOG technique is typically adopted to eliminate the PCB and provide a thinner overall liquid crystal display. For example, signal lines connecting the gate driver ICs are relatively small and are provided directly on the liquid crystal display panel. Accordingly, gate driver ICs are connected to the liquid crystal display via the TAB technique, are connected to each other in series via signal lines mounted on a lower glass substrate of the liquid crystal display panel, and receive control and driving voltage signals (i.e., gate driving signals).

Referring to FIG. 1, liquid crystal displays including LOG signal lines (e.g., formed without the gate PCB) typically include a liquid crystal display panel 1, a plurality of data TCPs 8 connected between a first side of the liquid crystal display panel 1 and a data PCB 12, a plurality of gate TCPs connected to a second side of the liquid crystal display panel 1, data driver ICs 10 mounted on the data TCPs 8, and gate driver ICs 16 mounted on the gate TCPs 14.

The liquid crystal display panel 1 includes a lower substrate 2 supporting signal lines and a thin film transistor array, an upper substrate 4 supporting a color filter array, and a layer of liquid crystal material between the lower and upper substrates 2 and 4, respectively. The liquid crystal display panel 1 further includes a picture display area 21 having liquid crystal cells arranged where gate lines 20 and data lines 18 cross each other. The data driver ICs 10 convert digital pixel data signals into analog pixel voltage signals and apply the analog pixel voltage signals to the data lines 18.

Data pads and gate pads (not shown) are arranged at respective ends of the data and gate lines 18 and 20 at an outer portion of the lower substrate 2, outside the picture display area 21. An LOG signal line group 26 is positioned within the outer area and transmits gate driving signals to the gate driver ICs 16.

Data TCPs 8 include input pads 24 and output pads 25 for electrically connecting the data driver IC 10 mounted thereon to the data PCB 12 and the data lines 18. The input pads 24 of the data TCP 8 are electrically connected to the output pads of the data PCB 12 while the output pads 25 of the data TCP 8 are electrically connected to the data pads arranged on the lower substrate 2. A first data TCP 8 is further provided with a gate driving signal transmission group 22. The gate driving signal transmission group 22 electrically connects the LOG signal line group 26 to the timing controller and power supply via the data PCB 12.

Each of the gate TCPs 14 includes a gate driving signal transmission line group 28 and output pads 30 electrically connecting the gate driver ICs 16 mounted thereon to the LOG signal line group 26 and the gate lines 20, respectively. Accordingly, the output pads 30 are electrically connected to the gate pads arranged on the lower substrate 2.

Each gate driver IC 16 sequentially applies a scanning signal (e.g., a gate high voltage signal (Vgh)) to each of the gate lines 20 in response to inputted control signals. Further, the gate driver ICs 16 apply a gate low voltage signal (Vgl) to each of the gate lines 20 not in receipt of the gate high voltage signal (Vgh).

The LOG signal line group 26 typically consists of signal transmission lines and transmits direct current (DC) voltage signals (e.g., gate high voltage (Vgh), gate low voltage (Vgl), common voltage (Vcom), ground voltage (GND), supply voltage (Vcc) signals, etc.) and gate control signals (e.g., gate start pulse (GSP), gate shift clock (GSC), gate enable (GOE) signals, etc.).

Individual signal transmission lines within the LOG signal line group 26 are arranged in a fine parallel pattern and are provided within a narrow space, similar to a space where signal lines in gate and data pads are positioned at outer portions of the picture display area 21. Signal transmission lines within the LOG signal line group 26 are formed of same metal as the gate metal layer and are arranged on the lower substrate 2. Being formed from the same material as the gate metal (e.g., AlNd, etc.), signal transmission lines within the LOG signal line group 26 typically have a resistivity of 0.046 and are formed simultaneously with the gate lines 20. Thus, the LOG signal line group 26 has a larger resistance than signal lines, typically made of a material such as copper, formed in the gate PCB. As resistance values of signal transmission lines within the LOG signal line group 26 are proportional to their lengths, the resistance of signal transmission lines increases as the distance from the data PCB 12 increases. Accordingly, gate driving signals, transmitted via the LOG signal line group 26, become attenuated, their voltage values become distorted, and the quality of pictures capable of being displayed on the liquid crystal display becomes deteriorated.

For example, distortion of the gate low voltage signal (Vgl) transmitted through the LOG signal line group 26 affects the picture quality displayed within the picture display area 21. Gate low voltage signals (Vgl) maintain the pixel voltage charged within the liquid crystal cell between intervals when the gate high voltage (Vgh) is charged within the pixel. Accordingly, as the gate low voltage signal is distorted, the pixel voltage within the liquid crystal cell also becomes distorted.

LOG gate low voltage transmission lines, arranged within the LOG signal line group 26, supply the gate low voltage (Vgl) and include a plurality of LOG gate low voltage transmission lines. The plurality of gate low voltage transmission lines electrically connect the first data TCP 8 and the plurality of gate TCPs 14, respectively. The plurality of gate low voltage transmission lines have intrinsic line resistance values proportional to their lengths, and are connected to each other in series via the plurality of gate TCPs 14. Thus, the brightness to which images may be expressed by liquid crystal cells connected to gate lines across the liquid crystal display panel becomes non-uniform. The non-uniform brightness across the liquid crystal display panel induces a cross-line phenomenon (32) that divides the screen in brightness values and thereby deteriorates the picture quality of the liquid crystal display.

Referring to FIG. 2, the gate low voltage signal (Vgl) is applied to the entire liquid crystal display panel via a relatively long transmission path and a load at a gate low voltage output terminal of the data TCP 8 is proportionally increased.

Referring to FIG. 2, a gate low voltage signal (Vgl) transmission path formed on the lower substrate 2 may equivalently be expressed as consisting essentially of an A-B transmission path and an A-C transmission path. A gate low voltage signal (Vgl) is applied to a dummy gate line GL0 on the A-B transmission path. Accordingly, the A-B transmission path typically includes a first gate low voltage line VGLL and a second gate low voltage line SDL arranged between the dummy gate line GL0 and the first gate low voltage line VGLL.

The first gate low voltage line VGLL may extend from the data TCP 8 to the lower end of the lower substrate 2 via the gate TCP (not shown). The second gate low voltage line SDL may extend from the first gate low voltage line VGLL at the lower end of the lower substrate 2 to the dummy gate line GL0 at the upper end of the lower substrate 2. The second gate low voltage line SDL crosses portions of the gate lines (not shown) arranged within a non-display area, outside the picture display area 21. Accordingly, the second gate low voltage line SDL may be formed from a source/drain metal layer and be insulated from the gate lines via a gate insulating film.

The first gate low voltage line VGLL has an intrinsic line resistance, Ra+Rb, which is determined by adding a first intrinsic line resistance, Ra, specific to the portion of the first gate low voltage line VGLL arranged between the data TCP 8 and a first gate TCP, and a second intrinsic line resistance, Rb, specific to the portion of the first gate low voltage line VGLL arranged between the gate TCPs. Similarly, the dummy gate line GL0 has a third intrinsic line resistance, Rc, and the second gate low voltage transmission line SDL has a fourth intrinsic line resistance, Rd. Thus, the total line resistance of the A-B transmission path is equal to the sum of the first to fourth line resistances, Ra+Rb+Rc+Rd.

The A-C transmission path supplies a gate low voltage signal (Vgl) to the nth gate line GLn via a corresponding gate driver IC (not shown). Accordingly, the A-C transmission path typically includes the first gate low voltage transmission line VGLL and the nth gate line GLn. The intrinsic line resistance of the nth gate line GLn is substantially equal to the third intrinsic line resistance, Rc, of the dummy gate line GL0. Thus, the total line resistance of the A-C transmission path is equal to the sum of the first to third line resistances, Ra+Rb+Rc.

The load present at the output terminal of the data TCP 8 is proportional to the total line resistance of the gate low voltage line at the output terminal of the data TCP 8. Accordingly, the total line resistance of the gate low voltage line at the output terminal of the data TCP 8 may be expressed as Ra+Rb+((Rc+Rd)/Rc). For example, assuming that Ra=15Ω, Rb=45Ω, Rc=3 kΩ and Rd=5 kΩ, the total line resistance of the A-B transmission path is 15Ω+45Ω+3 kΩ+5 kΩ=8.06 kΩ, the total line resistance of the A-C transmission path is 15Ω+45Ω+3 kΩ=3.06 kΩ, and the total line resistance of the first gate low voltage transmission line VGLL becomes 15Ω+45Ω+((3 kΩ+5 kΩ)/3 kΩ)≈3.24 kΩ.

In order to overcome the relatively large line resistance of the A-B transmission path, a relatively large load is provided at the gate low voltage output terminal of the data TCP 8. Such a large load further distorts the gate low voltage signals (Vgl) applied from the gate low voltage output terminal. Accordingly, unstable gate low voltage signals (Vgl) are applied to the gate lines within the picture display area 21 and further induce a deterioration in the picture quality. Further, differences in gate low voltage signals for each gate driver IC are enlarged due to the line resistance within of the gate low voltage line. Accordingly, the aforementioned cross-line phenomenon is magnified across the liquid crystal display.

The first gate low voltage line VGLL is typically positioned at the outermost portion of the lower substrate 2, is formed relatively shorter in length than other LOG signal lines, and is patterned to have a maximized line width within a confined space. As the first gate low voltage line VGLL is positioned at the outermost portion of the lower substrate 2, a gate low voltage signal (Vgl) applied to the dummy gate line GL0 passes the first gate low voltage line VGLL and the second gate low voltage line SDL. Since the A-B transmission path (VGLL+SDL) of the gate low voltage signal (Vgl) applied to the dummy gate line GL0 is longer than the A-C transmission path of the gate low voltage signal (Vgl) applied to another gate line (eg., GLn), the intrinsic line resistance of the A-B transmission path is larger than intrinsic line resistance of the A-C transmission path. Accordingly, a voltage associated with a gate low voltage signal (Vgl) applied to the dummy gate line GL0 is reduced compared to a voltage associated with the gate low voltage signal (Vgl) applied another gate line (e.g., GLn). Accordingly, capacitance values of storage capacitors Cst connected to the dummy gate line GL0 are reduced compared to capacitance values of storage capacitors Cst connected to another gate line (e.g., GLn) such that liquid crystal cells connected to the dummy gate line GL0 express images at a greater brightness than liquid crystal cells connected to another gate line (e.g., GLn).

SUMMARY OF THE INVENTION

Accordingly, the present invention is directed to a line-on-glass (LOG)-type liquid crystal display of that substantially obviates one or more of the problems due to limitations and disadvantages of the related art.

An advantage of the present invention provides a LOG liquid crystal display device wherein a load at a gate low voltage line may be reduced to minimize a distortion of gate low voltage signals applied.

Another advantage of the present invention provides a LOG-type liquid crystal display device wherein a line resistance of a dummy gate line is reduced thereby preventing the cross-line phenomenon from being induced.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a line-on-glass type liquid crystal display device may include a picture display area having a plurality of liquid crystal cells arranged at each crossings of gate lines and data lines, a storage capacitor arranged within each of the liquid crystal cells for maintaining a charged pixel voltage, wherein a storage capacitor is arranged within the liquid crystal cells connected to a dummy gate line (e.g., a first gate line), a line-on-glass signal line group provided at the outer region of the picture display area for transmitting driving signals required by the gate driver integrated circuits for driving the gate lines, wherein the a resistance value of the dummy gate line is smaller than resistance values of other gate lines.

In one aspect of the present invention, an portion of the dummy gate line is has a cross-sectional area larger than the cross-section areas of other gate lines.

In another aspect of the present invention, the dummy gate line may be formed from a conductive material having a smaller resistivity value than the resistivity values of the other gate lines.

In yet another aspect of the present invention, the line-on-glass type liquid crystal display device may further include a first gate low voltage line and a second gate low voltage line connected between the first gate low voltage line and the dummy gate line, crossing the gate lines outside the picture display area, and insulated from the gate lines.

In one aspect of the present invention, the second gate low voltage line may have a cross-sectional area larger than a cross-sectional area of the first gate low voltage line.

In still another aspect of the present invention, the second gate low voltage line may be formed from a conductive material having a resistivity value smaller than a resistivity value of the first low voltage line.

In an additional aspect of the present invention, the second gate low voltage line may be formed from a source/drain metal layer and cross gate lines while being insulated from the gate lines via a first insulating film. Alternatively, the second gate low voltage line may be formed from a metal layer other than the source drain metal layer and cross the source/drain metal layer while being insulated from the source/drain metal layer via a second insulating film.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 3:
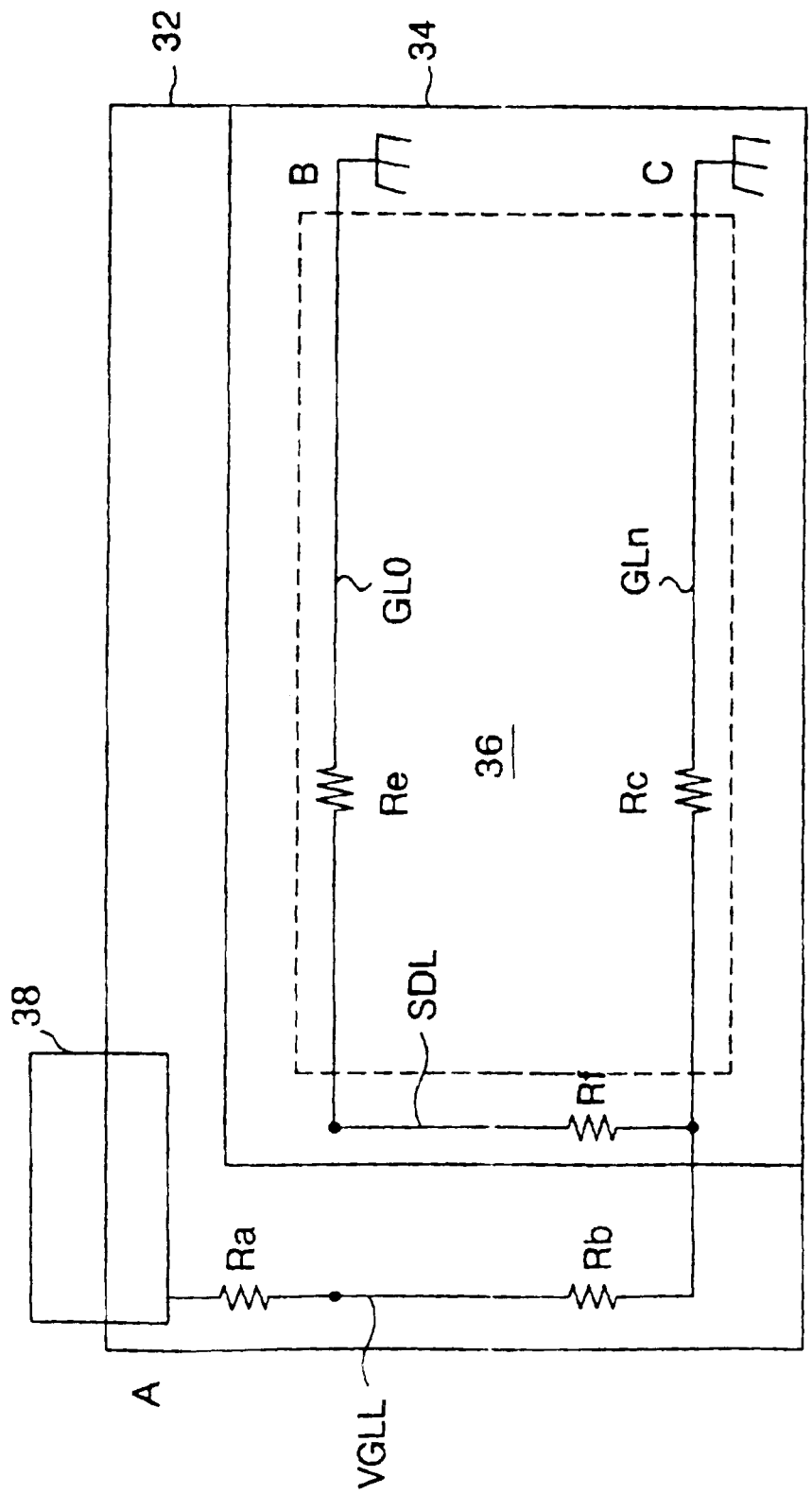
FIG. 3 illustrates a gate low voltage transmission line of a line-on-glass type liquid crystal display according to one aspect of the present invention.

FIG. 3 illustrates a gate low voltage transmission line of a line-on-glass type liquid crystal display according to one aspect of the present invention.

Referring to FIG. 3, a liquid crystal display panel may, for example, include a lower substrate 32 supporting signal lines and a thin film transistor array, an upper substrate 34 supporting a color filter array, and liquid crystal material (not shown) injected between the lower and upper substrates 32 and 34. The liquid crystal display panel may further be provided with a picture display area 36 capable of displaying a picture and having a plurality of liquid crystal cells arranged at crossings of a plurality of gate lines GL0 to GLn and a plurality of data lines (not shown). At an outer region of the lower substrate 32, outside the picture display area 36, data pads and gate pads (not shown) may be connected to end portions of the data lines and gate lines GL0 to GLn, respectively. Further, a LOG signal line group may be arranged at the outer region of the lower substrate 32 for transmitting gate driving signals to a gate driver IC (not shown).

The LOG-type signal line group may transmit direct current voltage signals (e.g., gate high voltage (Vgh), gate low voltage (Vgl), common voltage (Vcom), ground voltage (GND), supply voltage (VCC) signals, etc.) generated by a power supply (not shown) and also transmit gate control signals (e.g., gate start pulse (GSP), gate shift clock (GSC), gate enable (GOE) signals, etc.) generated by a timing controller (not shown). In one aspect of the present invention, the LOG signal line group may be formed from a same material used in forming the gate lines GL0 to GLn (e.g., a gate metal).

A data driver IC (not shown) may be mounted on data TCP 38, connected to the data pads formed on the lower substrate 32. The data driver IC may convert digital pixel data signals into analog pixel voltage signals and apply the analog pixel voltage signals to the data lines arranged on the liquid crystal display panel. In one aspect of the present invention, a first data TCP 38 may further include a gate driving signal transmission line group connected to the LOG signal line group. The gate driving signal transmission line group may transmit gate driving signals from the timing controller and the power supply to the LOG-type signal line group via a data PCB (not shown).

Similarly, a plurality of gate driver ICs (not shown) may be mounted on a plurality of gate TCP (not shown), connected to gate pads formed on the lower substrate 32. In one aspect of the present invention, the gate TCPs may further include a gate driving signal transmission line group connected between the LOG signal line group and the gate driver ICs. The gate driver ICs may sequentially apply gate high voltage signals (Vgh) to the gate lines in response to inputted control signals. Further, the gate driver ICs may apply gate low voltage signals (Vgl) to the gate lines during a time period when the gate high voltage signal (Vgh) is not applied to the gate lines.

According to the principles of the present invention, a gate low voltage signal (Vgl) transmission path formed on the lower substrate 32 may be equivalently expressed as including an A-B transmission path and an A-C transmission path. A gate low voltage signal (Vgl) may be applied to a dummy gate line GL0 via the A-B transmission path and a gate low voltage signal (Vgl) may be applied to another gate line (e.g., the nth gate line GLn) via the A-C transmission path.

In one aspect of the present invention, the A-B transmission path may include a first gate low voltage line VGLL, a dummy gate line GL0 and a second gate low voltage line SDL connected between the first gate low voltage line VGLL and the dummy gate line GL0. In another aspect of the present invention, the A-C transmission path may be include the first gate low voltage line VGLL and a gate line other than the dummy gate line (e.g., the nth gate line GLn).

The first gate low voltage line VGLL may extend from the data TCP 38 to a lower end of the lower substrate 32 via the gate TCP (not shown). The second gate low voltage line SDL may extend from the lower end of the lower substrate 32 to the dummy gate line GL0 at an upper end of the lower substrate 32. The second gate low voltage line SDL may cross portions of the gate lines arranged within the non-display area, outside the picture display area 36. Accordingly, the second gate low voltage line SDL may be formed from a source/drain metal layer and be insulated from the gate lines via a gate insulating film.

According to the principles of the present invention, the A-B transmission path is longer than the A-C transmission path. Accordingly, a difference between the line resistances encountered by gate low voltage signal (Vgl) transmitted through the A-B and A-C transmission paths to the dummy gate line GL0 and another gate line GLn, respectively, may be compensated for by altering a cross-sectional area and/or resistivity value of the dummy gate line GL0. In one aspect of the present invention, the cross-sectional area and/or the resistivity value of the dummy gate line GL0 may be altered such that it is different than cross-sectional area and/or the resistivity value of another gate line (e.g., nth gate line GLn). In another aspect of the present invention, the cross-sectional area of the dummy gate line GL0 may be provided larger than a cross-sectional area than another gate line (e.g., GLn) by, for example, increasing the line width and/or the thickness of the dummy gate line GL0. In yet another aspect of the present invention, the dummy gate line GL0 may be formed from a conductive material having a resistivity smaller than conductive material from which the other gate lines are formed.

According to the principles of the present invention, a line resistance of, for example, the second gate low voltage line SDL may be reduced, thereby reducing the line resistance of the A-B transmission path. In one aspect of the present invention, the line resistance of the second gate low voltage line SDL may be reduced by increasing a cross-sectional area of the second gate low voltage line SDL. In another aspect of the present invention, the line resistance of the second gate low voltage line SDL may be reduced by forming the second gate low voltage line SDL from a conductive material (e.g., Al, Cu, etc.) having a resistivity smaller than the conductive material from which the first gate low voltage line VGLL is formed. In yet another aspect of the present invention, the line resistance of the second gate low voltage line SDL may be reduced by forming the second gate low voltage line SDL from a metal layer different than that found in the source/drain metal layer. In still another embodiment of the present invention, the line resistance of the second gate low voltage line SDL may be reduced by forming the second gate low voltage line SDL in a process where the source/drain metal layer is not formed (e.g., in a process where a transparent electrode layer is formed).

According to the principles of the present invention, a line resistance of the dummy gate line GL0 may be reduced in addition to a line resistance of the second gate low voltage line SDL such that the line resistance of the A-B transmission path is reduced compared to that of the A-C transmission path.

Figure 1:
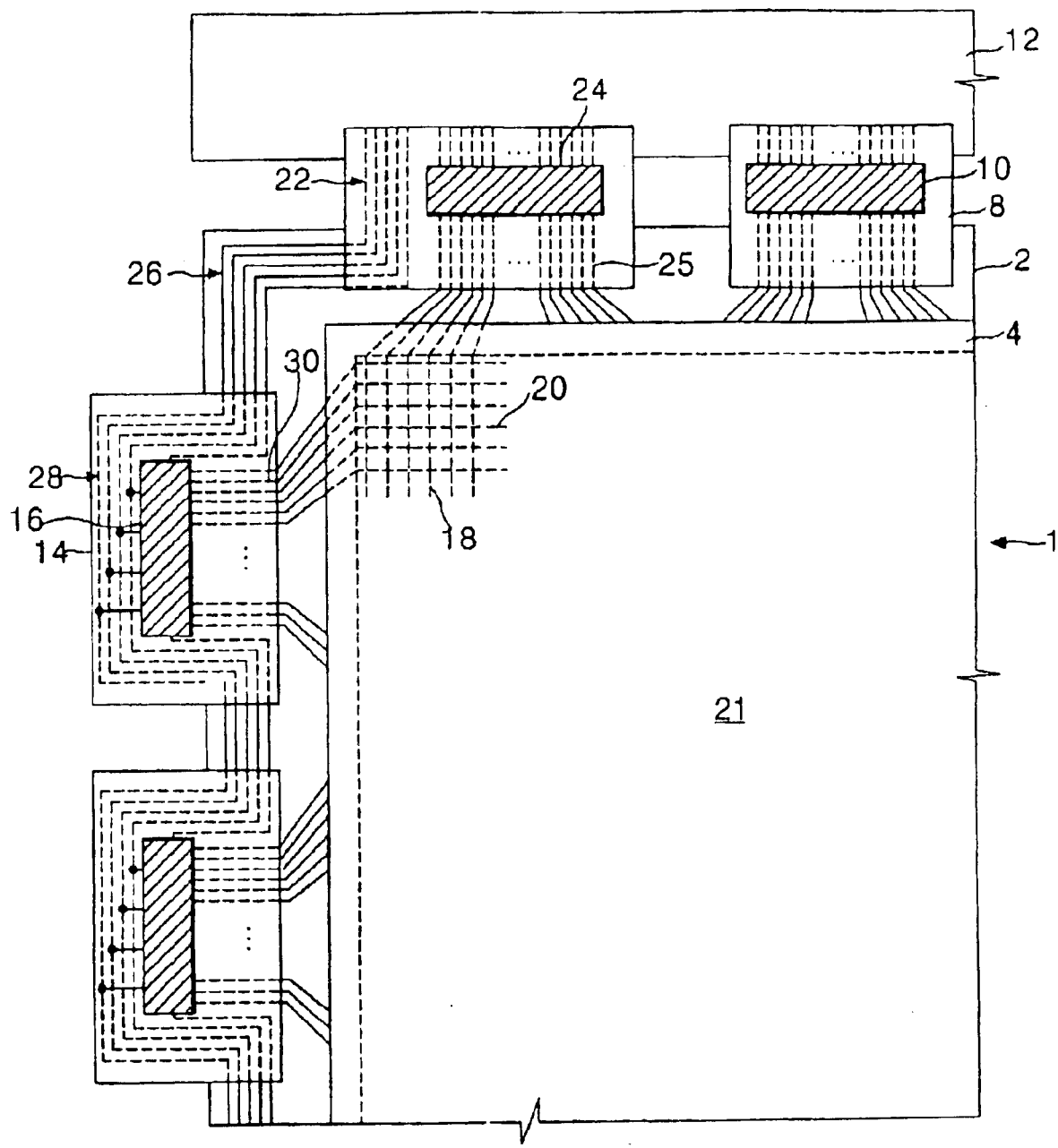
FIG. 1 illustrates a schematic view of a line-on-glass type liquid crystal display.
Figure 2:
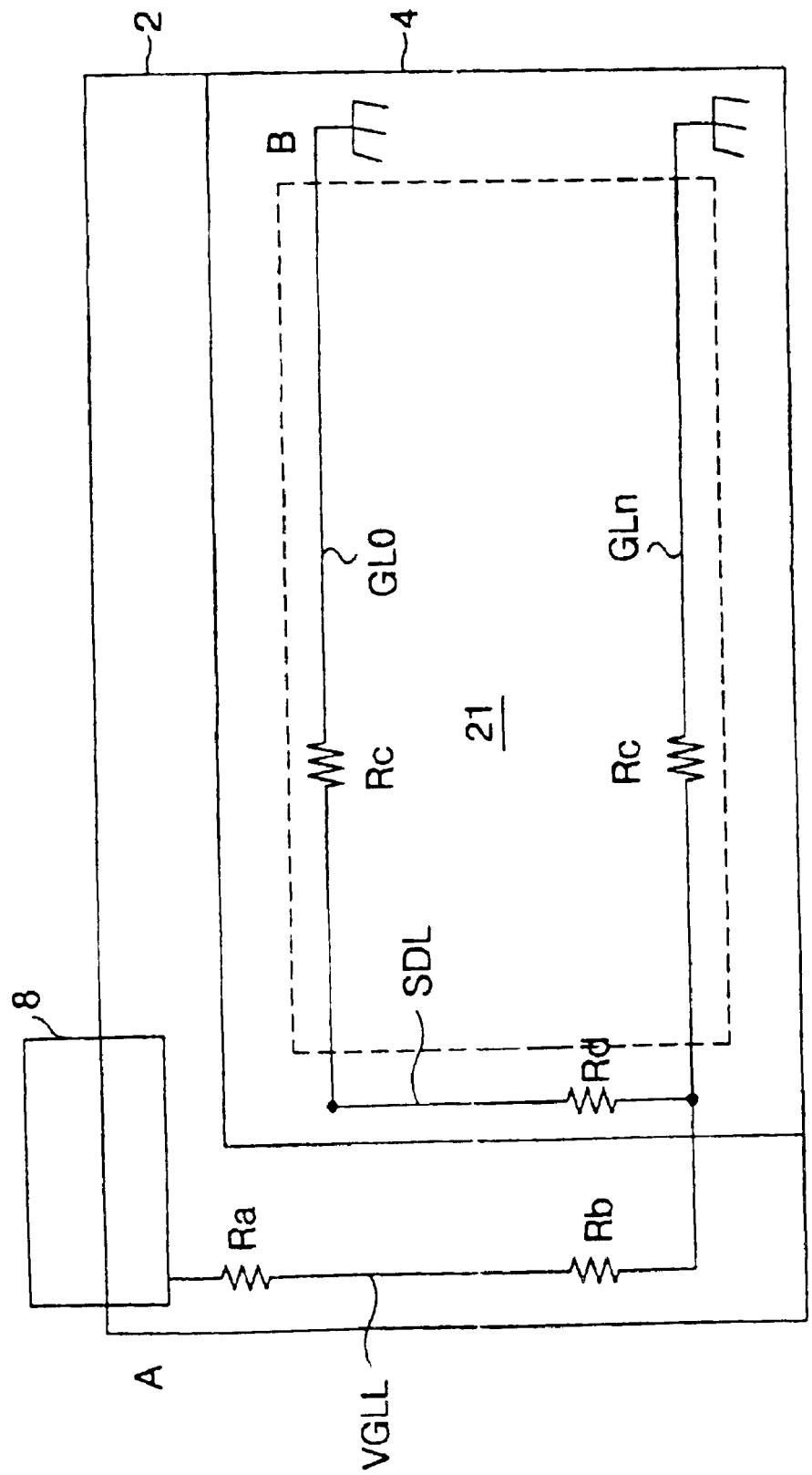
FIG. 2 illustrates a gate low voltage transmission line within the liquid crystal display panel shown in FIG. 1.

The first gate low voltage line VGLL may, for example, have a line resistance, Ra+Rb, which is obtained by adding a first intrinsic line resistance, Ra, specific to the portion of the first gate low voltage line VGLL arranged between the data TCP 38 and a first gate TCP and a second intrinsic line resistance, Rb, specific to the portion of the first gate low voltage line VGLL arranged between the gate TCPs. Similarly, a gate line other than the dummy gate line GL0 (e.g., nth gate line GLn) may have a third intrinsic line resistance, Rc, the second gate low voltage transmission line SDL may have a fourth intrinsic line resistance, Rf, lower than the fourth intrinsic line resistance Rd as shown in FIG. 2, and the dummy gate line GL0 may have a fifth intrinsic line resistance, Re, lower than the third intrinsic line resistance, Rc.

Accordingly, a total line resistance of the A-B transmission path may be approximately Ra+Rb+Rf+Re while a total line resistance of the A-C transmission path may be approximately Ra+Rb+Rc. For example, assuming that Ra≈15Ω, Rb≈45Ω, Rc≈3 kΩ, Re≈1.5 kΩ and Rf≈2 kΩ, a total line resistance of the A-B transmission path may be approximately 3.56 kΩ (15Ω+45Ω+2 kΩ+1.5 kΩ) while a total line resistance of the A-C transmission path may be approximately 3.06 kΩ (15Ω+45Ω+3 kΩ). Accordingly, a difference between a total line resistance of the A-B transmission path and a total line resistance of the A-C transmission path is substantially reduced almost to the point no difference in line resistance exists. Accordingly, a voltage associated with a gate low voltage signal (Vgl) applied to the dummy gate line GL0 may be substantially equal to a voltage associated with the same gate low voltage signal (Vgl) applied to another gate line (e.g., GLn). The effects of the cross-line phenomenon may be minimized such that liquid crystal cells connected to the dummy gate line GL0 may express images at substantially the same brightness as liquid crystal cells connected to the other gate line (e.g., GLn).

Furthermore, as the line resistance of the A-B transmission path is reduced, a total load amount of the gate low voltage transmission line at the output terminal of the data TCP 38 may be (Rc/(Re+Rf))+Ra+Rc. For example, a total load amount of the gate low voltage transmission line at the output terminal of the data TCP 38 may be approximately (3 kΩ/(1.5 kΩ+2 kΩ))+15Ω+45Ω. Such a load amount is considerably reduced in comparison to the load amount at the output terminal of the data TCP 38 shown in FIG. 2. Furthermore, total load of the gate low voltage transmission line may be reduced so that a stable gate low voltage signal may be applied to the gate lines, thereby preventing deterioration in picture quality caused by unstable gate low voltage signals.

In accordance with the principles of the present invention, the dummy gate line may be provided with a smaller line resistance value than other gate lines and/or the second gate low voltage line may be provided with a smaller line resistance value than the first gate low voltage line. Accordingly, a total line resistance of the transmission path transmitting a gate low voltage to the dummy gate line is reduced and a difference in gate low voltages between the dummy gate line and other gate lines is substantially non-existent, thereby preventing inducement of the cross-line phenomenon. Furthermore, a stable gate low voltage may be applied to the gate lines as total load at the data TCP 38 is reduced, thereby preventing deterioration in picture quality caused by unstable gate low voltage signals.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A line-on-glass liquid crystal display device, comprising:
    a plurality of data lines;
    a plurality of gate lines;
    a dummy gate line provided as a first one of the plurality of gate lines;
    a picture display area;
    a plurality of liquid crystal cells arranged within the picture display area at crossings of the plurality of gate lines and the plurality of data lines;
    a storage capacitor arranged within each of the liquid crystal cells for maintaining a charged pixel voltage;
    a plurality of gate driver integrated circuits for driving the plurality of gate lines; and
    a line-on-glass signal line group arranged outside the picture display area for transmitting driving signals to the plurality of gate driver integrated circuits,
    wherein a resistance value of the dummy gate line is smaller than a resistance value of the other of the plurality of gate lines.

2. The line-on-glass liquid crystal display device according to claim 1, wherein a cross-sectional area of the dummy gate line is greater than a cross-sectional area of each of the plurality of gate lines.

3. The line-on-glass liquid crystal display device according to claim 2, wherein the dummy gate line is formed from a conductive material having a resistivity value less than a resistivity value of the plurality of gate lines.

4. The line-on-glass liquid crystal display device according to claim 1, wherein the dummy gate line is formed from a conductive material having a resistivity value less than a resistivity value of the plurality of gate lines.

5. The line-on-glass liquid crystal display device according to claim 1, wherein the line-on-glass signal line group comprises:
    a first gate low voltage line; and
    a second gate low voltage line connected between a first gate low voltage line and the dummy gate line, wherein the second gate low voltage line crosses the plurality of gate lines outside the picture display area, wherein the second gate low voltage line is insulated from the plurality of gate lines.

6. The line-on-glass liquid crystal display device according to claim 5, wherein the second gate low voltage line is formed from a source/drain metal layer and crosses and is insulated from the plurality of gate lines.

7. The line-on-glass liquid crystal display device according to claim 5, wherein the second gate low voltage line is formed from a metal other than a source/drain metal layer and crosses and is insulated from the source/drain metal layer.

8. The line-on-glass liquid crystal display device according to claim 5, wherein a cross-sectional area of the second gate low voltage line is greater than a cross-sectional area of the first gate low voltage line.

9. The line-on-glass liquid crystal display device according to claim 8, wherein the second gate low voltage line is formed from a conductive material having a resistivity value less than a resistivity value of a material from which the first gate low voltage line is formed.

10. The line-on-glass liquid crystal display device according to claim 5, wherein the second gate low voltage line is formed from a conductive material having a resistivity value less than a resistivity value of a material from which the first gate low voltage line is formed.

11. A liquid crystal display device, comprising:
    a plurality of consecutively arranged gate lines;
    a liquid crystal display panel including a non-display area;
    a signal output terminal;
    a first transmission path through which a signal is outputted to a first one of the plurality of consecutively arranged gate lines; and
    a second transmission path through which a signal is outputted to a successive one of the plurality of consecutively arranged gate lines, wherein a portion of the first transmission path has a smaller resistance than a portion of the second transmission path.

12. The liquid crystal display device according to claim 11, wherein the signal comprises a gate low voltage.

13. The liquid crystal display device according to claim 11, wherein the first and second transmission paths comprise an identical signal line.

14. The liquid crystal display device according to claim 11, wherein the first transmission path comprises a first line-on-glass signal line, a second line-on-glass signal line, and the first one of the plurality of consecutively arranged gate lines.

15. The liquid crystal display device according to claim 14, wherein the portion of the first transmission path having the smaller resistance comprises the second line-on-glass signal line.

16. The liquid crystal display device according to claim 15, wherein the second line-on-glass signal line has a lower resistivity than the first line-on-glass signal line.

17. The liquid crystal display device according to claim 15, wherein the second line-on-glass signal line has a cross-sectional area greater than a cross-sectional area of the first line-on-glass signal line.

18. The liquid crystal display device according to claim 15, wherein the second line-on-glass signal line is formed of a material having a lower resistivity than a resistivity value of a material from which the first line-on-glass signal line is formed.

19. The liquid crystal display device according to claim 11, wherein the second transmission path comprises a first line-on-glass signal line and the successive one of the plurality of consecutively arranged gate lines.

20. The liquid crystal display device according to claim 11, wherein the portion of the first transmission path having the smaller resistance comprises the first one of the plurality of consecutively arranged gate lines.

21. The liquid crystal display device according to claim 20, wherein the first one of the plurality of consecutively arranged gate lines has a larger cross-sectional area than a cross-sectional area of the successive one of the plurality of consecutively arranged gate lines.

22. The liquid crystal display device according to claim 20, wherein the first one of the plurality of consecutively arranged gate lines is formed of a material having a lower resistivity than a resistivity value of a material from which the successive one of the plurality of consecutively arranged gate lines is formed.

* * * * *